(12) United States Patent
Shivadas et al.

(10) Patent No.: US 11,528,540 B2
(45) Date of Patent: *Dec. 13, 2022

(54) SYSTEM AND METHOD FOR DECREASING AN INITIAL BUFFERING PERIOD OF AN ADAPTIVE STREAMING SYSTEM

(71) Applicant: DIVX, LLC, San Diego, CA (US)

(72) Inventors: Abhishek Shivadas, San Diego, CA (US); Kourosh Soroushian, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,026

(22) Filed: Apr. 9, 2021

(65) Prior Publication Data

US 2021/0409839 A1 Dec. 30, 2021

Related U.S. Application Data

(63) Continuation of application No. 15/937,715, filed on Mar. 27, 2018, now Pat. No. 10,979,782, which is a
(Continued)

(51) Int. Cl.
*H04N 21/845* (2011.01)
*H04N 21/2343* (2011.01)
(Continued)

(52) U.S. Cl.
CPC ... *H04N 21/8456* (2013.01); *H04N 21/23439* (2013.01); *H04N 21/44209* (2013.01);
(Continued)

(58) Field of Classification Search
CPC ............. H04L 63/0428; H04L 62/4092; H04L 62/4069
See application file for complete search history.

(56) References Cited

U.S. PATENT DOCUMENTS

| 5,400,401 A | 3/1995 | Wasilewski et al. |
| 5,574,785 A | 11/1996 | Ueno et al. |

(Continued)

FOREIGN PATENT DOCUMENTS

| CA | 2237293 A1 | 7/1997 |
| EP | 1453319 A1 | 9/2004 |

(Continued)

OTHER PUBLICATIONS

Information Technology—MPEG Systems Technologies—Part 7: Common Encryption in ISO Base Media File Format Files (ISO/IEC 23001-7), Apr. 1, 2015, 24 pgs.
(Continued)

*Primary Examiner* — Barbara B Anyan
(74) *Attorney, Agent, or Firm* — KPPB LLP

(57) ABSTRACT

System and methods for selecting one of the alternative streams of encoded media from a group of alternative streams of encoded media for use during start-up of playback of the encoded media in accordance with embodiments of this invention are disclosed. The systems and methods begin by determining an estimated stability period for a current bandwidth of a communicative connection between the playback device and a remote system providing the alternative streams of encoded. A test process is then performed on the streams of encoded media to select one of streams of encoded media that provides portions of said encoded media such that an underflow condition does not occur during the estimated stability period. The streaming of encoded media is then commenced by requesting the portions of encoded media be transmitted from the remote server using the selected stream.

20 Claims, 7 Drawing Sheets

Related U.S. Application Data continuation of application No. 13/631,017, filed on Sep. 28, 2012, now Pat. No. 9,936,267.

(60) Provisional application No. 61/696,095, filed on Aug. 31, 2012.

(51) Int. Cl.
*H04N 21/442* (2011.01)
*H04N 21/6379* (2011.01)
*H04N 21/658* (2011.01)
*H04L 65/612* (2022.01)

(52) U.S. Cl.
CPC ....... *H04N 21/6379* (2013.01); *H04L 65/612* (2022.05); *H04N 21/6581* (2013.01)

(56) References Cited

U.S. PATENT DOCUMENTS

| | | | |
|---|---|---|---|
| 5,600,721 A | 2/1997 | Kitazato | |
| 5,621,794 A | 4/1997 | Matsuda et al. | |
| 5,642,338 A | 6/1997 | Fukushima et al. | |
| 5,805,700 A | 9/1998 | Nardone et al. | |
| 5,813,010 A | 9/1998 | Kurano et al. | |
| 5,854,873 A | 12/1998 | Mori et al. | |
| 5,907,658 A | 5/1999 | Murase et al. | |
| 5,923,869 A | 7/1999 | Kashiwagi et al. | |
| 6,002,834 A | 12/1999 | Hirabayashi et al. | |
| 6,009,237 A | 12/1999 | Hirabayashi et al. | |
| 6,016,381 A | 1/2000 | Taira et al. | |
| 6,057,832 A | 5/2000 | Lev et al. | |
| 6,065,050 A | 5/2000 | DeMoney | |
| 6,266,483 B1 | 7/2001 | Okada et al. | |
| 6,282,320 B1 | 8/2001 | Hasegawa et al. | |
| 6,320,905 B1 | 11/2001 | Konstantinides | |
| 6,351,538 B1 | 2/2002 | Uz | |
| 6,373,803 B2 | 4/2002 | Ando et al. | |
| 6,385,673 B1 | 5/2002 | Demoney | |
| 6,415,031 B1 | 7/2002 | Colligan et al. | |
| 6,445,877 B1 | 9/2002 | Okada et al. | |
| 6,453,115 B1 | 9/2002 | Boyle | |
| 6,453,116 B1 | 9/2002 | Ando et al. | |
| 6,504,873 B1 | 1/2003 | Vehvilaeinen | |
| 6,512,883 B2 | 1/2003 | Shim et al. | |
| 6,594,699 B1 | 7/2003 | Sahai et al. | |
| 6,654,933 B1 | 11/2003 | Abbott et al. | |
| 6,671,408 B1 | 12/2003 | Kaku | |
| 6,690,838 B2 | 2/2004 | Zhou | |
| 6,724,944 B1 | 4/2004 | Kalevo et al. | |
| 6,751,623 B1 | 6/2004 | Basso et al. | |
| 6,813,437 B2 | 11/2004 | Ando et al. | |
| 6,871,006 B1 | 3/2005 | Oguz et al. | |
| 6,912,513 B1 | 6/2005 | Candelore | |
| 6,931,531 B1 | 8/2005 | Takahashi | |
| 6,957,350 B1 | 10/2005 | Demos | |
| 6,970,564 B1 | 11/2005 | Kubota et al. | |
| 6,983,079 B2 | 1/2006 | Kim | |
| 7,006,757 B2 | 2/2006 | Ando et al. | |
| 7,007,170 B2 | 2/2006 | Morten | |
| 7,020,287 B2 | 3/2006 | Unger | |
| 7,047,309 B2 | 5/2006 | Baumann et al. | |
| 7,151,832 B1 | 12/2006 | Fetkovich et al. | |
| 7,188,183 B1 | 3/2007 | Paul et al. | |
| 7,212,726 B2 | 5/2007 | Zetts | |
| 7,242,772 B1 | 7/2007 | Tehranchi | |
| 7,274,861 B2 | 9/2007 | Yahata et al. | |
| 7,295,673 B2 | 11/2007 | Grab et al. | |
| 7,349,886 B2 | 3/2008 | Morten et al. | |
| 7,352,956 B1 | 4/2008 | Winter et al. | |
| 7,382,879 B1 | 6/2008 | Miller | |
| 7,397,853 B2 | 7/2008 | Kwon et al. | |
| 7,400,679 B2 | 7/2008 | Kwon et al. | |
| 7,418,132 B2 | 8/2008 | Hoshuyama | |
| 7,457,415 B2 | 11/2008 | Reitmeier et al. | |
| 7,499,930 B2 | 3/2009 | Naka et al. | |
| 7,546,641 B2 | 6/2009 | Robert et al. | |
| 7,639,921 B2 | 12/2009 | Seo et al. | |
| 7,640,435 B2 | 12/2009 | Morten | |
| 7,711,052 B2 | 5/2010 | Hannuksela et al. | |
| 7,770,200 B2 | 8/2010 | Brooks et al. | |
| 7,853,980 B2 | 12/2010 | Pedlow, Jr. et al. | |
| 7,864,186 B2 | 1/2011 | Robotham et al. | |
| 7,908,393 B2 | 3/2011 | Marr et al. | |
| 7,945,143 B2 | 5/2011 | Yahata et al. | |
| 7,949,775 B2 | 5/2011 | Virdi et al. | |
| 8,009,575 B2 | 8/2011 | Spain et al. | |
| 8,099,757 B2 | 1/2012 | Riedl et al. | |
| 8,131,875 B1 | 3/2012 | Chen | |
| 8,169,916 B1 | 5/2012 | Pai et al. | |
| 8,243,924 B2 | 8/2012 | Chen et al. | |
| 8,286,213 B2 | 10/2012 | Seo | |
| 8,312,079 B2 | 11/2012 | Newsome et al. | |
| 8,369,421 B2 | 2/2013 | Kadono et al. | |
| 8,516,144 B2 | 8/2013 | Hsu et al. | |
| 8,649,669 B2 | 2/2014 | Braness et al. | |
| 8,683,066 B2 | 3/2014 | Hurst et al. | |
| 8,782,268 B2 | 7/2014 | Pyle et al. | |
| 8,812,662 B2 | 8/2014 | Soroushian et al. | |
| 8,819,116 B1 | 8/2014 | Tomay et al. | |
| 8,832,297 B2 * | 9/2014 | Soroushian ...... H04N 21/44209 709/231 |
| 8,849,950 B2 | 9/2014 | Stockhammer et al. | |
| 8,918,533 B2 | 12/2014 | Chen et al. | |
| 8,997,160 B2 | 3/2015 | Hunt et al. | |
| 9,038,116 B1 | 5/2015 | Knox et al. | |
| 9,088,527 B2 | 7/2015 | Manor et al. | |
| 9,124,642 B2 | 9/2015 | Choudhury et al. | |
| 9,313,249 B2 | 4/2016 | Soroushian et al. | |
| 9,420,024 B2 | 8/2016 | Pearson et al. | |
| 9,491,498 B2 | 11/2016 | Brooks et al. | |
| 9,521,178 B1 | 12/2016 | Freeman, II et al. | |
| 9,936,267 B2 | 4/2018 | Shivadas et al. | |
| 2001/0021276 A1 | 9/2001 | Zhou | |
| 2001/0052077 A1 | 12/2001 | Fung et al. | |
| 2001/0052127 A1 | 12/2001 | Seo et al. | |
| 2002/0048450 A1 | 4/2002 | Zetts | |
| 2002/0067432 A1 | 6/2002 | Kondo et al. | |
| 2002/0135607 A1 | 9/2002 | Kato et al. | |
| 2002/0141503 A1 | 10/2002 | Kobayashi et al. | |
| 2002/0154779 A1 | 10/2002 | Asano et al. | |
| 2002/0164024 A1 | 11/2002 | Arakawa et al. | |
| 2002/0169971 A1 | 11/2002 | Asano et al. | |
| 2003/0002577 A1 | 1/2003 | Pinder | |
| 2003/0044080 A1 | 3/2003 | Frishman et al. | |
| 2003/0053541 A1 | 3/2003 | Sun et al. | |
| 2003/0063675 A1 | 4/2003 | Kang et al. | |
| 2003/0077071 A1 | 4/2003 | Lin et al. | |
| 2003/0135742 A1 | 7/2003 | Evans | |
| 2003/0142594 A1 | 7/2003 | Tsumagari et al. | |
| 2003/0206717 A1 | 11/2003 | Yogeshwar et al. | |
| 2004/0001594 A1 | 1/2004 | Krishnaswamy et al. | |
| 2004/0022391 A1 | 2/2004 | Obrien | |
| 2004/0028227 A1 | 2/2004 | Yu | |
| 2004/0037421 A1 | 2/2004 | Truman | |
| 2004/0047592 A1 | 3/2004 | Seo et al. | |
| 2004/0047607 A1 | 3/2004 | Seo et al. | |
| 2004/0076237 A1 | 4/2004 | Kadono et al. | |
| 2004/0081333 A1 | 4/2004 | Grab et al. | |
| 2004/0093494 A1 | 5/2004 | Nishimoto et al. | |
| 2004/0101059 A1 | 5/2004 | Joch et al. | |
| 2004/0107356 A1 | 6/2004 | Shamoon et al. | |
| 2005/0013494 A1 | 1/2005 | Srinivasan et al. | |
| 2005/0063541 A1 | 3/2005 | Candelore | |
| 2005/0076232 A1 | 4/2005 | Kawaguchi | |
| 2005/0144468 A1 | 6/2005 | Northcutt | |
| 2005/0177741 A1 | 8/2005 | Chen et al. | |
| 2005/0243912 A1 | 11/2005 | Kwon et al. | |
| 2005/0265555 A1 | 12/2005 | Pippuri | |
| 2006/0002425 A1 | 1/2006 | Mane et al. | |
| 2006/0013568 A1 | 1/2006 | Rodriguez | |
| 2006/0031564 A1 | 2/2006 | Brassil et al. | |
| 2006/0165163 A1 | 7/2006 | Burazerovic et al. | |
| 2007/0047645 A1 | 3/2007 | Takashima | |
| 2007/0067472 A1 | 3/2007 | Maertens et al. | |

(56) References Cited

U.S. PATENT DOCUMENTS

| | | |
|---|---|---|
| 2007/0083467 A1 | 4/2007 | Lindahl et al. |
| 2007/0086485 A1 | 4/2007 | Vega-garcia et al. |
| 2007/0180051 A1 | 8/2007 | Kelly et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2009/0010622 A1 | 1/2009 | Yahata et al. |
| 2009/0013195 A1 | 1/2009 | Ochi et al. |
| 2009/0067535 A1* | 3/2009 | Koudo ............... H04L 12/2803 375/295 |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0144425 A1 | 6/2009 | Marr et al. |
| 2009/0178090 A1 | 7/2009 | Oztaskent |
| 2009/0249081 A1 | 10/2009 | Zayas |
| 2009/0282162 A1 | 11/2009 | Mehrotra et al. |
| 2009/0300203 A1 | 12/2009 | Virdi et al. |
| 2009/0310819 A1 | 12/2009 | Hatano |
| 2010/0142915 A1 | 6/2010 | Mcdermott et al. |
| 2010/0235542 A1 | 9/2010 | Visharam et al. |
| 2010/0306373 A1 | 12/2010 | Wormley |
| 2010/0306810 A1 | 12/2010 | Brooks et al. |
| 2011/0010466 A1 | 1/2011 | Fan et al. |
| 2011/0058675 A1 | 3/2011 | Brueck et al. |
| 2011/0066673 A1 | 3/2011 | Outlaw |
| 2011/0096828 A1 | 4/2011 | Chen et al. |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0141089 A1 | 6/2012 | Hunt |
| 2012/0167132 A1 | 6/2012 | Mathews et al. |
| 2012/0173751 A1 | 7/2012 | Braness et al. |
| 2012/0177101 A1* | 7/2012 | van der Schaar ............ H04N 21/26258 375/E7.026 |
| 2012/0179834 A1* | 7/2012 | van der Schaar .. H04N 21/6379 709/231 |
| 2012/0311174 A1 | 12/2012 | Bichot et al. |
| 2012/0324519 A1 | 12/2012 | Laughlin |
| 2012/0331167 A1 | 12/2012 | Hunt |
| 2013/0007200 A1 | 1/2013 | van der Schaar et al. |
| 2013/0007263 A1 | 1/2013 | Soroushian et al. |
| 2013/0007297 A1 | 1/2013 | Soroushian et al. |
| 2013/0013803 A1 | 1/2013 | Bichot et al. |
| 2013/0080267 A1 | 3/2013 | McGowan |
| 2014/0068096 A1 | 3/2014 | Shivadas et al. |
| 2014/0140253 A1 | 5/2014 | Lohmar et al. |
| 2014/0149557 A1 | 5/2014 | Lohmar et al. |
| 2014/0365651 A1 | 12/2014 | Soroushian et al. |
| 2015/0288530 A1 | 10/2015 | Oyman |

FOREIGN PATENT DOCUMENTS

| | | |
|---|---|---|
| EP | 1283640 B1 | 10/2006 |
| EP | 2180664 A1 | 4/2010 |
| EP | 2360923 A1 | 8/2011 |
| KR | 20040039852 A | 5/2004 |
| KR | 20060106250 A | 10/2006 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2013002828 A2 | 1/2013 |
| WO | 2013002834 A1 | 1/2013 |
| WO | 2013002835 A1 | 1/2013 |

OTHER PUBLICATIONS

International Preliminary Report on Patentability for International Application No. PCT/US2011/064684, dated Mar. 4, 2014, 5 pgs.
International Preliminary Report on Patentability for International Application No. PCT/US2011/068156, Report dated Jan. 7, 2014, 9 Pgs.
International Preliminary Report on Patentability for International Application No. PCT/US2011/068264, Search Completed Jan. 7, 2014, dated Jan. 16, 2014, 5 pgs.
International Search Report and Written Opinion for Application PCT/US2011/068264, Search Completed Mar. 30, 2012, dated May 1, 2012, 6 pgs.
International Search Report and Written Opinion for International Application No. PCT/US2011/068156, Search completed Apr. 7, 2012, dated May 1, 2012, 11 Pgs.
International Search Report and Written Opinion for International Application PCT/US2011/064684, Search Completed Mar. 26, 2012, dated Apr. 10, 2012, 7 pgs.
ISO/IEC 14496-12 Information technology—Coding of audio-visual objects—Part 12: ISO base media file format, Feb. 1, 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Pomelo, LLC Tech Memo, "Analysis of Netflix's Security Framework for 'Watch Instantly' Service", Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233, Version 9.1.0, Release 9, 18 pgs.
Universal Mobile Telecommunications Systems (UMTS); ETSI TS 126 244 V9.4.0 (May 2011) 3GPP TS 26.244, Version 9.4.0, Release 9, 58 pgs.
Apple HTTP Live Streaming specification, Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 2009, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
HTTP Live Streaming, Mar. 31, 2011, 24 pgs.
HTTP Live Streaming, Sep. 30, 2011, 33 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.eom/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.

(56) References Cited

OTHER PUBLICATIONS

"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
Microsoft Smooth Streaming specification, Jul. 22, 2013, 56 pgs.
"MPEG-2, Part 1, ISO/IEC 13818-1", Information technology—Generic Coding of Moving Pictures and Associated Audio: Systems, 161 pgs., Nov. 13, 1994.
"MPEG-4, Part 14, ISO/IEC 14496-14", Information technology—Coding of audiovisual objects, 18 pgs., Nov. 15, 2003.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Video Publishers Turning to HD Online Video to Boost Competitive Edge and Increase Revenues", Business Wire, Inc., Apr. 22, 2009, 2 pages, retrieved from https://global.factiva.com/ga/default.aspx.
"Windows Media Player 9", Microsoft, Mar. 23, 2017, 3 pgs.
Abomhara et al., "Enhancing Selective Encryption for H.264/AVC Using Advanced Encryption Standard", International Journal of Computer Theory and Engineering, Apr. 2010, vol. 2, No. 2, pp. 223-229.
Alattar et al., "Improved Selective Encryption Techniques for Secure Transmission of MPEG Video Bit-Streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", Deliverable 2.2, Feedback Algorithms for the Increase of the Objective Quality, 2015, 50 pgs.
Apostolopoulos et al., "Secure Media Streaming and Secure Transcoding", Multimedia Security Technologies for Digital Rights Management, 2006, pp. 241-273.
Asai et al., "Essential Factors for Full-Interactive VOD Server: Video File System, Disk Scheduling, Network", Proceedings of Globecom '95, Nov. 14-16, 1995, 6 pgs.
Begen et al., "Watching Video over the Web Part 1: Streaming Protocols", IEEE Internet Computing, Mar. 1, 2011, vol. 15, Issue 2, pp. 54-63.
Beker et al., "Cipher Systems: The Protection of Communications", Chapter 8: Applying Cipher Systems, 1982, 40 pgs.
Bocharov et al., "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (Presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, pp. 664-667.
Candelore et al., U.S. Appl. No. 60/372,901, filed Apr. 16, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", University of Alberta, Department of Computing Science, Thesis, Fall 1998, 95 pgs.
Cheng et al., "Partial Encryption of Compressed Images and Videos", IEEE Transactions on Signal Processing, vol. 48, No. 8, Aug. 2000, 13 pgs.
Cheung et al., "On the Use of Destination Set Grouping to Improve Fairness in Multicast Video Distribution", Proceedings of IEEE INFOCOM'96, Conference on Computer Communications, vol. 2, IEEE, Jul. 18, 1995, 23 pgs.
Collet, "Delivering Protected Content: An Approach for Next Generation Mobile Technologies", University of Namur, Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, Computer Security, Dec. 2001, 66 pgs.
Fang et al., "Real-Time Deblocking Filter for MPEG-4 Systems", Asia-Pacific Conference on Circuits and Systems, Oct. 28-31, 2002, Bali, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Gannes, "The Lowdown on Apple's HTTP Adaptive Bitrate Streaming", GigaOM, Jun. 10, 2009, 12 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo, Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, pp. 915-920.
Kalva, Hari, "Delivering MPEG-4 Based Audio-Visual Services", Kluwer Academic Publishers, 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "A Deblocking Filter with Two Separate Modes in Block-based Video Coding", IEEE Transactions on Circuits and Systems for Video Technology, vol. 9, No. 1, Feb. 1999, pp. 156-160.
Kim et al., "Tree-Based Group Key Agreement", ACM Transactions on Information and System Security, vol. 7, No. 1, Feb. 2004, pp. 60-96.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 8 pgs.
Li et al., "Layered Video Multicast with Retransmission (LVMR): Evaluation of Hierarchical Rate Control", Proceedings of IEEE INFOCOM'98, the Conference on Computer Communications, Seventeenth Annual Joint Conference of the IEEE Computer and Communications Societies, Gateway to the 21st Century, Cat. No. 98, vol. 3, 1998, 26 pgs.
List et al., "Adaptive Deblocking Filter", IEEE Transactions on Circuits and Systems for Video Technology, vol. 13, No. 7, Jul. 2003, pp. 614-619.
Liu et al., "Rate adaptation for adaptive HTTP streaming", MMSys '11 Proceedings of the second annual ACM conference on Multimedia systems, Feb. 23-25, 2011, San Jose, CA, USA, pp. 169-174.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, Technologies, Architectures, and Protocols for Computer Communications, Aug. 1996, 14 pgs.

(56) References Cited

OTHER PUBLICATIONS

Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A Postprocessing Method for Reducing Quantization Effects in Low Bit-Rate Moving Picture Coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (Presented in two parts).
Riiser et al., "Video Streaming Using a Location-based Bandwidth-Lookup Service for Bitrate Planning", ACM Transactions on Multimedia Computing, Communications, and Applications, vol. 8, Issue 3, Article No. 24, Jul. 2012, 24 pages.
Schulzrinne, H., "Real Time Streaming Protocol 2.0 (RTSP): draft-ietfmmusic-rfc2326bis-27", MMUSIC Working Group of the Internet Engineering Task Force (IETF), 296 pgs., Mar. 9, 2011.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, vol. 19, No. 9, Oct. 2004, 25 pgs.
Stockhammer, "Dynamic Adaptive Streaming over HTTP—Standards and Design Principles", Proceedings of the second annual ACM conference on Multimedia, Feb. 2011, pp. 133-143.
Timmerer et al., "HTTP Streaming of MPEG Media", Proceedings of Streaming Day, 2010, 4 pgs.
Tiphaigne et al., "A Video Package for Torch", IDIAP Communication, IDIAP-COM 04-02, Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, pp. 1028-1033.
Ventura, "Streaming of Multimedia Learning Objects", AG Integrated Communication System, Thesis, Mar. 2003, 101 pgs.
Waggoner, "Compression for Great Digital Video: Power Tips, Techniques, & Common Sense", CMP Books, 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 18, 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video Deblocking with Fine-Grained Scalable Complexity for Embedded Mobile Computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zambelli, "IIS Smooth Streaming Technical Overview", Microsoft Corporation, Mar. 2009, 17 pages.

\* cited by examiner

SYSTEM AND METHOD FOR DECREASING AN INITIAL BUFFERING PERIOD OF AN ADAPTIVE STREAMING SYSTEM

CROSS-REFERENCE TO RELATED APPLICATIONS

The current application is a continuation of U.S. patent application Ser. No. 15/937,715, filed Mar. 27, 2018, entitled "System and Method for Decreasing an Initial Buffering Period of an Adaptive Streaming System" to Shivadas et al. and will issue as U.S. Pat. No. 10,979,782, which is a continuation of U.S. patent application Ser. No. 13/631,017, filed Sep. 28, 2012, entitled "System and Method for Decreasing an Initial Buffering Period of an Adaptive Streaming System" to Shivadas et al. and issued as U.S. Pat. No. 9,936,267, which claims priority to U.S. Provisional Patent Application No. 61/696,095, filed Aug. 31, 2012, titled "System and Method for Decreasing an Initial Buffering Period of an Adaptive Streaming System", the disclosures of which are incorporated herein by reference.

FIELD OF THE INVENTION

This invention generally relates to start-up of playback of an encoded media in an adaptive streaming system. More particularly, this invention relates to systems and methods that can reduce the amount of encoded media buffered by a playback device prior to starting playback of the media.

BACKGROUND OF THE INVENTION

The term streaming media describes the playback of media on a playback device, where the media is stored on a server and continuously sent to the playback device over a network during playback. For purposes of this discussion, media and/or encoded media is defined as data of a work that includes video, audio, pictures, or another type of presentation that may be displayed, played or in some other way presented by a playback device. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

When a playback device commences adaptive bitrate streaming, the playback device typically starts by requesting portions of media from the lowest bitrate streams (where alternative streams are available). As the playback device downloads the requested media, the playback device can measure the available bandwidth. In the event that there is additional bandwidth available, the playback device can switch to higher bitrate streams.

To start playback of the encoded media, the playback device often attempts to buffer an adequate amount of the requested encoded media be received and stored to provide a minimum amount of playback time prior to commencing the playback. Buffering encoded media can assure that there are no underflow conditions during playback. An underflow condition is when the playback device does not have the next portion of encoded media needed to continue the playback. However, the acquisition of an adequate amount of encoded media usually causes a delay in the start of playback of the encoded media by the device. This is typically not a problem when the playback is only periodically started and/or re-started.

However, recently devices such as tablets and other mobile playback devices have made it easier for users to search the encoded media and re-start the playback at various points in the playback. As such, the conventional start-up requiring an adequate amount of encoded media may cause unsatisfactory pauses or delays in presentation of the playback. As such, those skilled in the art are constantly striving to provide a playback start-up that requires less of the encoded media prior to commencement of the playback to minimize the time needed for a start and/or re-start of the playback.

SUMMARY OF THE INVENTION

Systems and methods for decreasing an initial buffering period in an adaptive bitrate system in accordance with embodiments of this invention are disclosed. In accordance with some embodiments, a playback device selects one of set of alternative streams for start-up of playback of encoded media from a playback position within the encoded media in the following manner. The playback device begins by determining an estimated stability period for a current bandwidth of a communicative connection between the playback device and a remote system providing the alternative streams in response to a playback request. The playback device then selects one of the alternative streams from which each of the portions of the encoded media starting from the playback position can be provided prior to a playback time for the portion of encoded media during the estimated stability period such that an underflow condition does not occur during playback of the encoded media. The playback device then commences streaming of the encoded media by requesting the portions of encoded media be transmitted using the selected one of the alternative stream from the remote server. In accordance with some of these embodiments, the selected alternative stream also can provide a sufficient number of the portions of the encoded media starting from the playback position prior to an end of the estimated stability period to provide a sufficient buffer during playback after the estimated stability period has ended.

The selection of the alternative stream to use is performed in the following manner in accordance with some embodiments of this invention. The selection process begins by selecting of the alternative streams of encoded media to test. An index of portions of the encoded media for the selected stream is read to determine the size of each of the portions of encoded media starting from the playback position in the selected stream. A download time for each of the portions in the selected stream starting from the playback position is then determined based on the size of each of portions. The download time of each of the portions starting from the playback position is then compared to the playback time of the data in each of the portions and to determine whether an underflow condition occurs during the estimated stability period. If no under flow condition will occur, the download time of each of the portions is compared to an end time of the estimated stability period to determine whether a predetermined number of the portions of the selected stream is received prior to the end of the estimated stability period to provide a sufficient buffer for playback after the estimated stability period has ended. The stream is then selected if the process determines no underflow conditions will occur during the estimated stability period and if a sufficient buffer for playback is provided after the estimated stability period ends. In accordance with some of these embodiments, the selection of the streams and comparisons are repeated until a stream is selected.

In accordance with some embodiments of this invention, an alternative selection process is performed in response to a determination that none of the streams can provide the portions without an underflow condition and/or without a sufficient buffer at the end of the estimated stability period. In accordance with some embodiment of this invention the alternative selection process is performed by discarding a first portion from each of portions from each stream starting from the playback position from consideration and then repeating the selecting of one of the alternative streams, comparing of the download time of each of the portions to the playback time of each of the portions, and comparing of the download time of each of the of portions for each off the streams with the end time of the estimated stability period for the alternative streams with the first portion of each of the first portions discarded. In accordance with other embodiments, the alternative selection process is performed by selecting one of the alternative streams from which to obtain the portions of the encoded media and requiring a predetermined number of the portions starting from the playback position be received prior to commencing playback of the encoded media.

In accordance with some embodiments of this invention, the selection of one the alternative streams to test is based on a maximum bitrate of each of the plurality of alternative streams. In accordance with some embodiments of this invention the selection process further includes determining whether the index of portions for the selected alternative stream is stored by the playback device. If the index is not stored by the playback device, the index of portions for the selected alternative stream is requested from the remote system. The index of portions of the selected alternative stream is then received by the playback device in response to the request.

In accordance with some embodiments of this invention, the estimated stability period is determined by receiving the estimated stability period from the remote system. In accordance with other embodiment of this invention, the estimated stability period is determined by reading a predefined value for the estimated stability period from a memory of the playback device. In accordance with still other embodiments, the estimated stability period is calculated by the playback device from information about the communicative connection stored in memory.

DETAILED DISCLOSURE OF THE INVENTION

Turning now to the drawings, systems and methods for decreasing an initial buffering period in an adaptive bitrate system in accordance with embodiments of the invention are illustrated. Adaptive streaming systems generally require an initial buffering period in order to obtain enough data of the encoded media to avoid underflow conditions in the latter parts of the multimedia presentation. For purposes of this discussion, an underflow condition is when a playback device does not have enough data of the encoded media in a buffer to continue playback of the encoded media. Typically, this buffering period may apply to the initial start of the system, as well as after each trick-play or seek operation. In current playback devices, many stream switching algorithms enforce a rule involving buffering a predetermined duration of video. In many instances, adaptive bitrate streaming systems download portions of video that include closed groups of pictures and can perform stream switches between closed groups of pictures. Examples of rules involving buffering a predetermined duration of video include (but are not limited to) an 8 second rule used in an adaptive bitrate streaming system that downloads closed groups of pictures have 2 second durations. The 8 second rule involves the playback device receives enough data of the encoded media to provide 8 seconds of playback prior to commencing the playback of the encoded media. In accordance with embodiments of this invention, systems and methods are provided that allow only one portion of encoded media (i.e. one closed group of pictures), to be received prior to commencing the playback. This reduces the start-up time from the time needed to receive a specific number of portions of the media to the time needed to receive a single portion of the media to greatly enhance the user's enjoyment of the playback of the encoded media.

Streaming System Architecture

Figure 1:
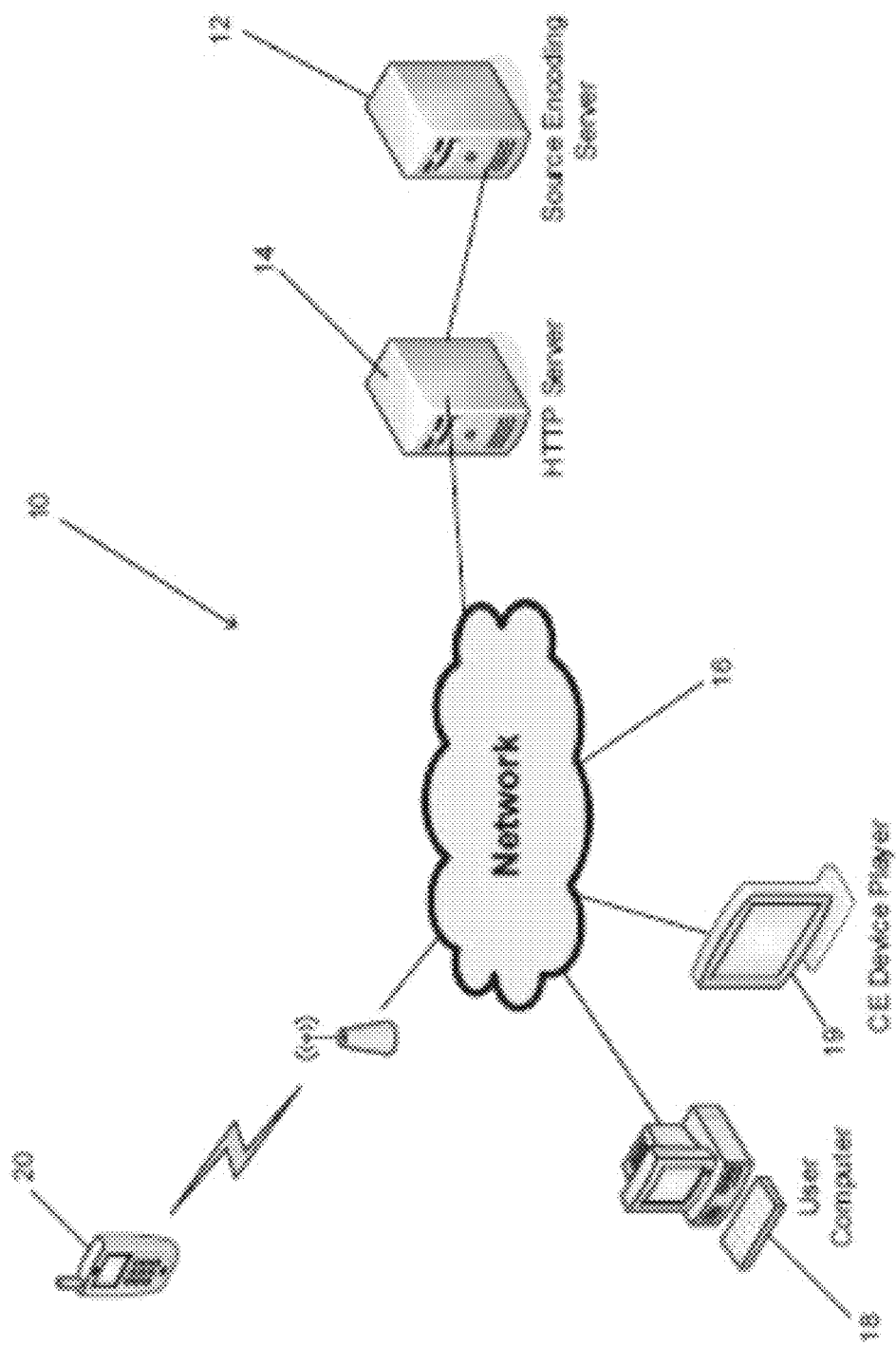
FIG. 1 illustrates a network diagram of a media streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
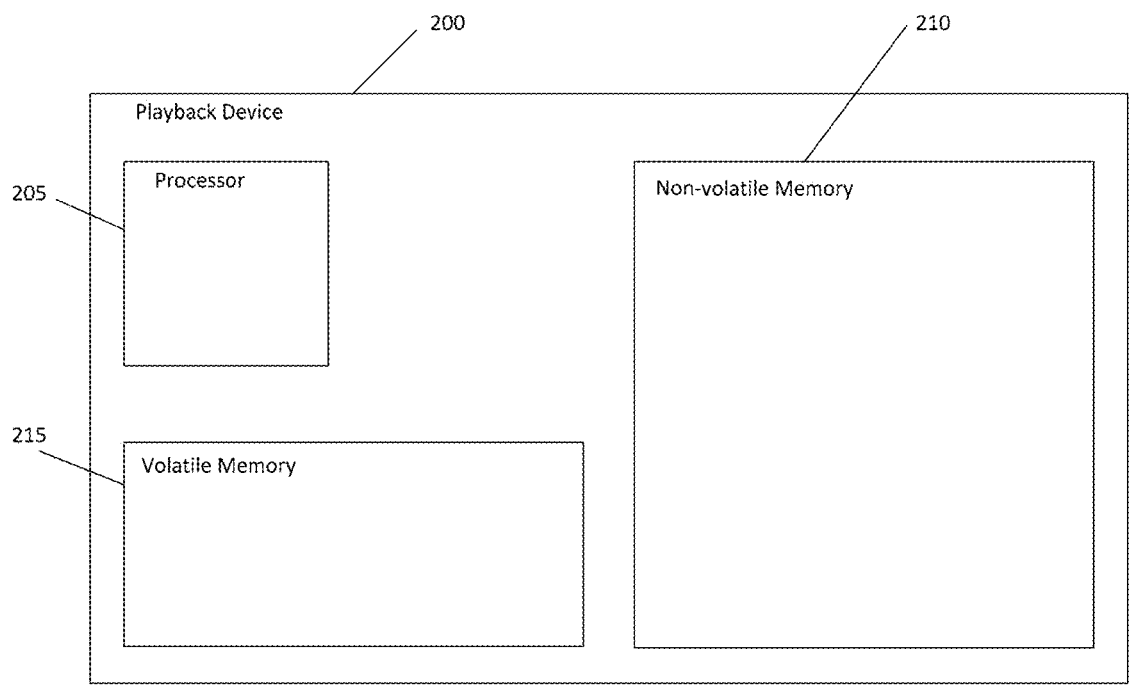
FIG. 2 illustrates a block diagram of a playback device that performs process for providing systems and methods in accordance with an embodiment of this invention.

The processes for providing methods and systems in accordance with this invention are executed by a playback device. The relevant components in a playback device that perform the processes in accordance with an embodiment of the invention are shown in FIG. 2. One skilled in the art will recognize that playback device may include other components that are omitted for brevity without departing from this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of computer readable media appropriate to a specific application. Although a specific playback device is illustrated in FIG. 2, any of a variety of playback devices configured to store encrypted cryptographic data and to collect information concerning device characteristics can be utilized in accordance with embodiments of the invention.

Playback Start-Up Process

In accordance with many embodiments of this invention, a process for providing start-up of a playback process with only a minimal amount of data of the encoded media is provided by the playback device. In adaptive streaming systems, such as the system described with reference to FIG. 1, the data for the encoded media is generally downloaded in packets or groups of data that are referred to as portions of encoded media for purposes of this discussion. The portions of encoded media typically represent a certain amount of playback time. The encoded media is typically divided based upon the amount of data need for playback between the time needed to switch streams. The portions of encoded media in the system described with reference to an embodiment of the invention as shown in FIG. 1 represent 2 seconds of playback time in accordance with an embodiment of this invention. However, other embodiments may divide the data based on other amounts of time without departing from this invention. In prior art adaptive streaming systems, the start-up algorithms for playback systems require a certain amount of playback time which, in turn, requires that at least a specified number portions of the encoded data be downloaded prior to the playback being commenced. In accordance with the embodiment shown in FIG. 1, the amount of playback time is 8 seconds and 4 portions, each representing 2 seconds of playback time are needed to provide the required data. One skilled in the art will recognize that other time limits for the playback time and portions may be used depending on the requirements of the system without departing from embodiments of this invention. The requirement of a certain amount of data to provide a certain amount of playback is to prevent underflow conditions from occurring during playback.

Figure 6:
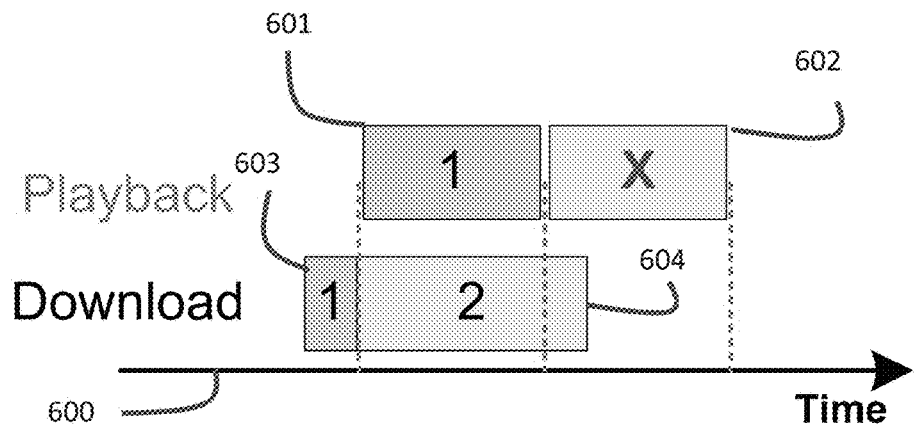
FIG. 6 illustrates a representation of playback time versus stream portion download time to describe an underflow condition in accordance with embodiments of this invention.

An underflow condition is when the playback device does not have enough data of the encoded media stored in a buffer to continue playback. FIG. 6 illustrates an underflow condition during playback. Playback periods 601 and 602 are the first and second playback periods for playing back the encoded media. In the system described with reference to FIG. 1, first and second playback periods 601 and 502 are each two second in length. However, one skilled in the art will recognize that the exact time of each playback period is dependent on the exact type of adaptive streaming system used and the above is for exemplary purposes only. First and second download time periods 603 and 604 are the periods needed to receive first and second portions of the stream of encoded media that provides the data for playback of the encoded media during first and second playback periods 601 and 602. As shown in FIG. 6, the downloading and playback of the encoded media occur along timeline 600. First download time period 603 is completed prior to the first playback period 601. Therefore, all of the data of the encoded media needed during first playback period 601 is received prior to first playback period 601. However, second download time period 604 overlaps with second playback period 602. Thus, the system has an underflow condition because the second portion of encoded data needed for playback during second playback period 602 is not received prior to the beginning of second playback period 602.

Figure 3:
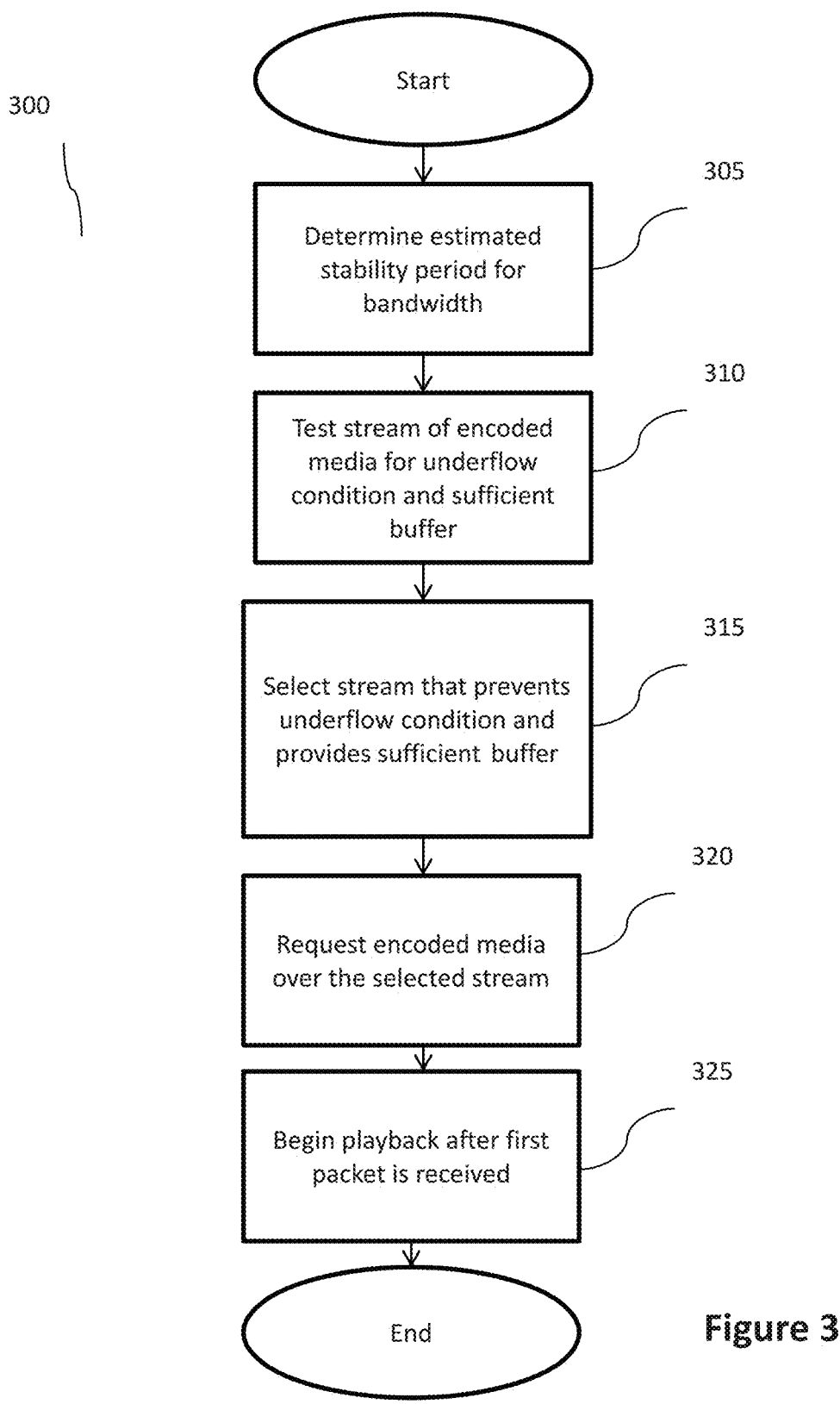
FIG. 3 illustrates a flow diagram of a process performed by a playback device for selecting a stream to reduce the amount of buffering needed for a start-up of playback of the encoded media in accordance with embodiments of this invention.

A process performed by a playback device for selecting a stream of encoded media in an adaptive streaming system such that playback may begin after receiving one portion of the encoded data of the stream in accordance with embodiments of this invention is shown in FIG. 3. Process 300 begins by determining an estimated stability period for the bandwidth of the communicative connection between the playback device and the remote server providing the streams of encoded data in 305. The bandwidth is a known bandwidth measure that is known or calculated by the playback device based upon network and connection conditions. The estimated period of stability is the time period that the bandwidth is expected to remain stable. The estimated period of stability varies based upon the conditions of the network to which the playback device is connected. In accordance with some embodiments of this invention, the estimated stability period may be a defined value stored in a memory of the playback device. In accordance with other embodiments, the estimated stability period may be calculated by the playback device from data gathered by the playback device while monitoring the current bandwidth and previous conditions stored in a persistent memory of the device. In still other embodiments, the estimated stability period may be received from a server that calculates the estimated stability period based on feedback from the playback device or based upon feedback received from a class of devices similar to the playback device.

In 310, the playback device tests the streams of encoded media to determine whether an underflow condition will occur during playback in the estimated stability period if the stream is used. The streams are also tested to determine whether a predetermined number of portions of the encoded media will be received during the estimated stability period to provide a sufficient buffer during playback. The predetermined number is a number of portions that provide data for a specified number of playback time periods after the estimated stability period expires. For example, a system may require enough portions of data to provide for 4 time periods of playback after the end of the estimated stability period or 8 seconds of playback time in accordance with an embodiment of this invention. However, the precise amount of portions and the amount of playback time required needed may vary based upon the configuration of the system and/or playback device.

A stream is selected to use to receive the portions of the encoded media needed for playback at 315. The stream is selected because the test process determined that no underflow conditions will occur during the estimated stability period when portions of the encoded media are received using the stream. Furthermore, the stream may also satisfy a requirement that at least the predetermined number of portions of the encoded media will be received by the end of the estimated stability period to provide a sufficient buffer during playback after the estimated stability period in accordance with some embodiments of this invention. The buffer can allow the playback device to determine an adequate stream to use to receive portions of the encoded media based upon the bandwidth conditions after the estimated stability period to continue playback. After the stream is selected, the playback device transmits a request to the remote server to provide portions of the encoded media using the selected stream in 320. The playback device then begins playback of the encoded media after the first portion of the encoded media is received in 325 and process 300 ends.

Figure 4:
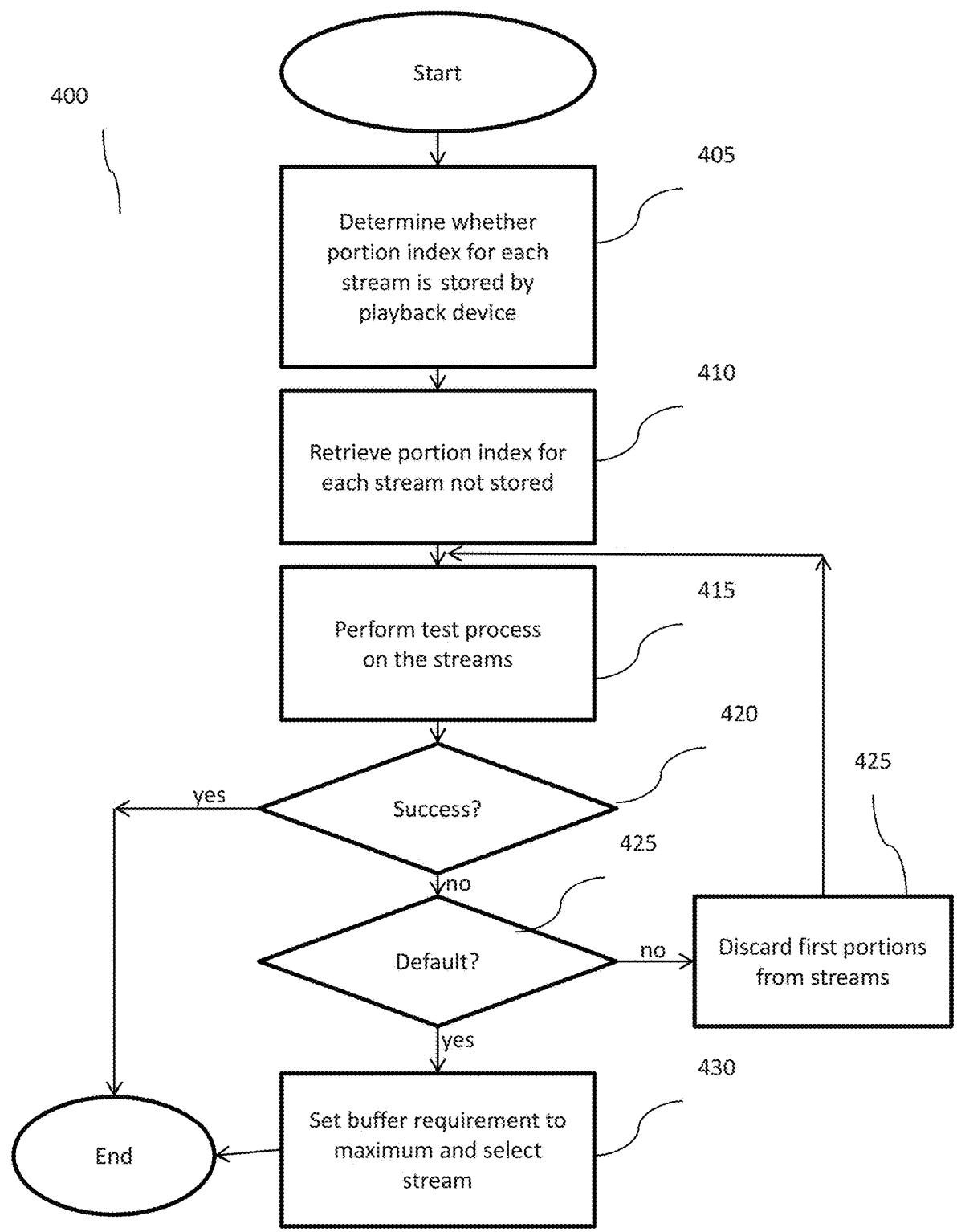
FIG. 4 illustrates a flow diagram of a process for testing the streams of encoded media to select a stream in accordance with embodiments of this invention.

A process performed by the playback device to test the streams of encoded media to select a stream that provides portions of the encoded media starting from the playback position that do not cause an underflow condition during playback in the estimated stability period and provides a predetermined number of portions prior to the end of the estimated stability period to provide a sufficient buffer during playback in accordance with an embodiment of this invention is shown in FIG. 4. Process 400 begins in 405 by determining whether a portion index for each of the streams being tested is stored in a memory of the playback machine. These portion indexes are typically part of the information downloaded by the playback device with the top level index and stream information from the container files and provide the size of each portion of the encoded media in the stream. If the playback device does not have a portion index for one or more of the streams, the playback device requests and receives the portion indexes for the streams that are not stored from the remote server in 410.

In 415, the playback device performs a test process on the streams. An embodiment of the test process is described below with reference to FIG. 5. In 420, process 400 determines whether the test process successfully selected a stream for use during the startup of playback. If a stream has been selected by the test process, process 300 ends. If a stream has not been selected, process 400 may allow a default process for start-up of playback in 425. If the default process is used, a buffer requirement is set to a maximum predetermined number of portions to provide enough data for a certain amount of playback time and a stream of encoded media is selected. In the embodiment described with reference to FIG. 1, the maximum default buffer is set to 4 portions of the encoded media in order to provide 8 seconds of playback. However, any number of portions may be used and any amount of playback time may be required without departing from this invention. The exact number of portions and amount of playback time required for the buffer depend on the adaptive streaming system used.

Alternatively, process 400 may discard the first portion of encoded data from each stream in 425 and repeat the test process from 415 using the stream with the discarded first portion. This allows the process to try to determine a stream that can be used to allow star-up of the playback of the encoded media after two portions of the encoded media are downloaded.

Figure 5:
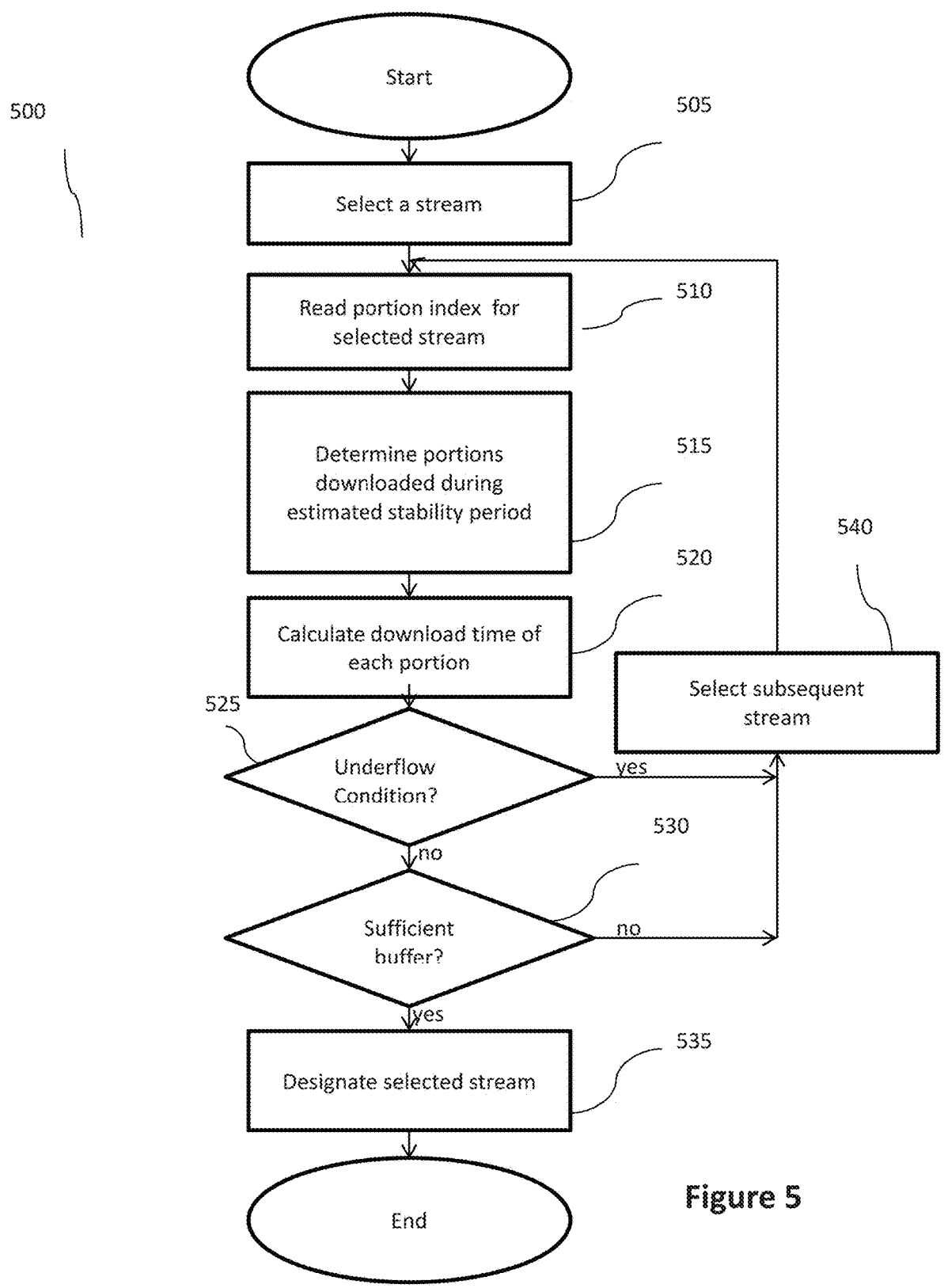
FIG. 5 illustrates flow diagram of a test process performed on the streams to determine whether an underflow condition will occur during an estimated stability period and that a sufficient buffer will be provided at an end of the estimated stability period in accordance with embodiments of this invention.

A process performed by playback device in 415 of process 400 to select a stream in accordance with embodiments of this invention is shown in FIG. 5. Process 500 begins in 505 by selecting a stream. In accordance with some embodiments, the stream may be selected by the maximum bitrate of each stream in either ascending or descending order. However, those skilled in the art will recognize that other properties of the encoded media in the streams, such as resolution and frame rate may also be used for the selection of the stream to test without departing from embodiments of this invention.

After the stream is selected, the portion index for the selected stream is read in 510. Process 400 then determines the portions of the stream starting from the playback position of the encoded media and the size of each portion that may be downloaded during the estimated stability period in 515. The information about the size of the portions is then used to determine the download time of each portion of the selected stream in 520. In 525, the download time of each of the portions starting from the playback position is compared to a playback time for the information to determine whether an underflow condition may occur. If process 500 determines that an underflow condition may occur for the selected stream, a new stream is selected, if available, in 540 and process 500 is repeated from 510 for the subsequent stream. If there are no more streams available, process 500 may return an indication that test process 500 was unsuccessful in selecting a stream.

If process 500 determines that no underflow condition may occur, process 500 determines whether a predetermined number of portions of the stream starting from the playback position of the encoded media may be downloaded prior to the end of the estimated stability period. If it is determined that at least the predetermined number of portions will be downloaded, the stream will provide a sufficient buffer for playback at the end of the estimated stability period and process 500 selects the stream for use in 535. Otherwise, a new stream is selected, if available, in 540 is repeated from 510 for the subsequent stream. If there are no more streams available, process 500 may return an indication that test process 500 was unsuccessful in selecting a stream.

Example of Test Process

Figure 7:
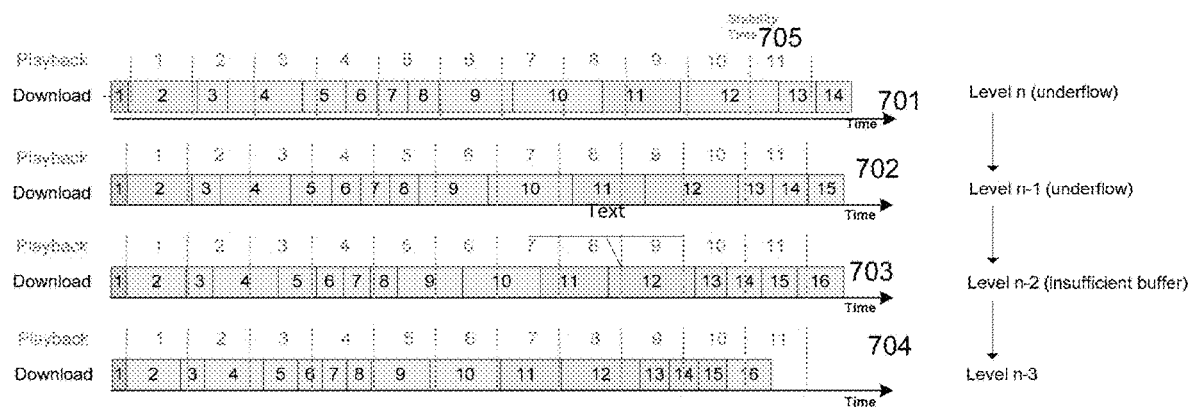
FIG. 7 illustrates the download times for portions of encoded media of various streams versus the estimated stability period and playback time in accordance with an embodiment of this invention.

An illustration of the selection of a stream for use in receiving portions of the encoded media in accordance with an embodiment is provided with respect to FIG. 7. Four streams, 701-704, that may be used by a playback device to receive portions of the encoded media for playback of the encoded media in an embodiment of this invention are shown. The playback device uses the above described process to select one of streams for use in playback. Streams 701-704 are shown in descending order of maximum bitrates and the streams are selected in the test process in accordance with maximum bitrates. In the example, the test process begins be determining the estimated stability period. The end of the estimated stability period is shown as line 705. The test process first reads the index of portions of encoded data of stream 701 and determines the download times of the portions starting from the playback position in the encoded media as shown. The download times are then compared to the playback times of the portions. As can be seen in FIG. 7, the download time of the second portion of stream 701 does not end prior to the beginning of the second playback time. Therefore, the test process moves to the next stream with the next highest maximum bitrate, stream 702.

The test process reads the portion index for stream 702 and determines the playback times for the portions of encoded media starting from the playback position as shown in line 702. The playback times of the portions of stream 702 are compared to the playback times. As can be seen in FIG. 7, the download time of the second portion of stream 702 does not end prior to the beginning of the second playback time. Therefore, the test process moves to the next stream with the next highest maximum bitrate, stream 703. The test process reads the portion index for stream 703 and determines the playback times for the portions of encoded media starting from the playback position as shown in line 703. The playback times of the portions of stream 703 are compared to the playback times. As can be seen from line 703, no underflow conditions may occur as all of the portions will be received prior to the corresponding playback time. Thus, the process determines whether a predetermined number of portions will be received prior to the end of the estimated stability period using stream 703. In this case, the stability period ends after the $10^{th}$ playback period or 20 seconds. Therefore, the stream must be able to provide at least 28 seconds of playback or 14 portions of encoded media prior to the end of the estimated stability period. Stream 703 only provides 13 complete portions prior to the end of the estimated stability period. As such, the test process does not select stream 703 for use and selects the stream with next highest maximum bandwidth, stream 704 for testing. The test process reads the portion index for stream 704 and determines the playback times for the portions of encoded media starting from the playback position as shown in line 704. The playback times of the portions of stream 704 are compared to the playback times. As can be seen from line 704, no underflow conditions may occur as all of the portions will be received prior to the corresponding playback time prior to the end of the estimated stability period. Thus, the test process then determines whether the predetermined number of portions may be downloaded prior to the end of the estimated stability period. As seen in line 704, 15 portions of encoded media may be received prior to the end of the estimated stability period. Thus, the test process selects stream 704 to provide the portions of encoded media for playback as stream 704 will not cause underflow conditions during the estimated period of stability and provides a sufficient buffer at the end of the estimated period of stability.

Improved Playback Start Up Time

Figure 8:
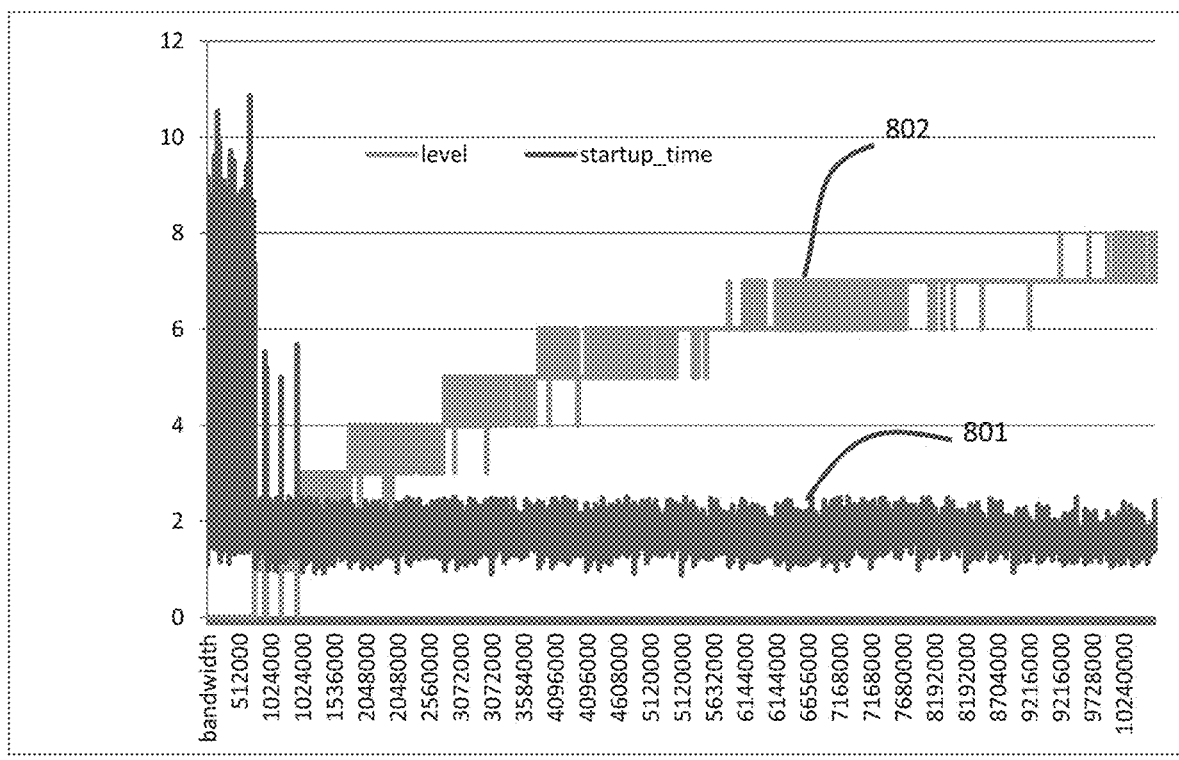
FIG. 8 illustrates a chart showing bandwidth versus average start-up time of playback in accordance with an embodiment of this invention.

FIG. 8 illustrates a chart of playback start-up times for an embodiment in accordance with this invention. In the described embodiment, the adaptive streaming system provides 9 streams. The bandwidth of the communicative connection between the playback device and remote server is varied between 500 Kbps and 10 Mbps. The estimated stability period for the bandwidth is 20 seconds and the system has a constant change in seek times. Line 801 shows the selected streams for the playback. The time of the start-up is shown be line 802. The bandwidth is shown along the x-axis and the time is shown along the y-axis. As can be seen from the chart, the average playback start-up time is approximately 1.8 seconds after a single portion of the encoded media has been downloaded. This represents a significant improvement over the typical 8 seconds for a conventional playback start-up.

The above is description of embodiments of systems and methods in accordance with the present invention. It is foreseen that other skilled in the art will design alternative systems that infringe on this invention as set forth in the following claims either literally or through the Doctrine of Equivalents.

What is claimed is:

1. A method of determining whether an underflow condition will occur in a particular stream of encoded media during a stability period, the method comprising:
   requesting playback of content from one or more servers;
   estimating the stability period of a communicative connection between a playback device and the one or more servers, where the estimated stability period is a period of time that the communicative connection is expected to remain stable based on bandwidth conditions;

selecting one of a plurality of streams of encoded media to be assessed, where the selected stream comprises encoded media divided into a plurality of portions, each portion having the same playback duration;

determining a download time for each of the plurality of portions based on the size of each of the plurality of portions; and determining whether an underflow condition will occur in the selected stream during the estimated stability period by comparing the determined download time of each of the plurality of positions to the playback duration of each of the plurality of portions and accumulating the difference.

2. The method of claim 1, wherein selecting one of the plurality of streams of encoded media to be assessed comprises selecting the stream of encoded media with the highest maximum bit rate.

3. The method of claim 2, wherein selecting one of the plurality of streams of encoded media to be assessed, determining a download time for each of the plurality of portions, and determining whether an underflow condition will occur in the selected stream is repeated until a stream is selected where an underflow condition will not occur.

4. The method of claim 3, wherein the next selected one of the plurality of streams of encoded media to be assessed is the stream of encoded media with the next highest maximum bit rate.

5. The method of claim 1, wherein determining the download time for each of the plurality of portions comprises reading an index of portions of the selected stream of encoded media to determine the size of each of the plurality of portions of the stream of encoded media.

6. The method of claim 1, further comprising:

discarding a first portion from each of the plurality of portions of the selected stream from consideration in response to a determination that the plurality of portions of the stream of the encoded media cannot be provided using any of the plurality of streams prior to playback time during the estimated stability period; and repeating the steps of selecting one of the plurality of streams, determining a download time for each of the plurality of portions without the first portion, and determining whether an underflow condition will occur without the first portion.

7. The method of claim 1, further comprising performing an alternative selection process for selecting one of the plurality of alternative streams in response to a determination that an underflow condition will occur during the estimated stability period.

8. The method of claim 1, further comprising, in response to a determination that an underflow will occur in all of the plurality of streams during the estimated stability period, requiring a predetermined number of the plurality of portions be received prior to commencing playback of the encoded media.

9. The method of claim 1, wherein determining the estimated stability period comprises receiving the estimated stability period from the one or more servers.

10. The method of claim 1, wherein determining the estimated stability period comprises reading a predefined value for the estimated stability period from a memory of the playback device.

11. A playback device for playing back a stream of encoded media comprising:

a memory;

a processor configured via a client application stored in the memory to:

request playback of content from one or more servers;

estimate a stability period of a communicative connection between a playback device and the one or more servers, where the estimated stability period is a period of time that the communicative connection is expected to remain stable based on bandwidth conditions;

select one of a plurality of streams of encoded media to be assessed, where the selected stream comprises encoded media divided into a plurality of portions, each portion having the same playback duration;

determine a download time for each of the plurality of portions based on the size of each of the plurality of portions; and determine whether an underflow condition will occur in the selected stream during the estimated stability period by comparing the determined download time of each of the plurality of positions to the playback duration of each of the plurality of portions and accumulating the difference.

12. The playback device of claim 11, wherein selecting one of the plurality of streams of encoded media to be assessed comprises selecting the stream of encoded media with the highest maximum bit rate.

13. The playback device of claim 12, wherein selecting one of the plurality of streams of encoded media to be assessed, determining a download time for each of the plurality of portions, and determining whether an underflow condition will occur in the selected stream is repeated until a stream is selected where an underflow condition will not occur.

14. The playback device of claim 13, wherein the next selected one of the plurality of streams of encoded media to be assessed is the stream of encoded media with the next highest maximum bit rate.

15. The playback device of claim 11, wherein determining the download time for each of the plurality of portions comprises reading an index of portions of the selected stream of encoded media to determine the size of each of the plurality of portions of the stream of encoded media.

16. The playback device of claim 11, wherein the processor is further configured via the client application stored in the memory to:

discard a first portion from each of the plurality of portions of the selected stream from consideration in response to a determination that the plurality of portions of the stream of the encoded media cannot be provided using any of the plurality of streams prior to playback time during the estimated stability period; and repeat the steps of selecting one of the plurality of streams, determining a download time for each of the plurality of portions without the first portion, and determining whether an underflow condition will occur without the first portion.

17. The playback device of claim 11, wherein the processor is further configured via the client application stored in the memory to perform an alternative selection process for selecting one of the plurality of alternative streams in response to a determination that an underflow condition will occur during the estimated stability period.

18. The playback device of claim 11, wherein the processor is further configured via the client application stored in the memory to, in response to a determination that an underflow will occur in all of the plurality of streams during the estimated stability period, require a predetermined number of the plurality of portions be received prior to commencing playback of the encoded media.

19. The playback device of claim 11, wherein determining the estimated stability period comprises receiving the estimated stability period from the one or more servers.

20. The playback device of claim 11, wherein determining the estimated stability period comprises reading a predefined value for the estimated stability period from a memory of the playback device.

\* \* \* \* \*